April 8, 1930.  E. A. GALLISON  1,754,157

FISH CUTTING MACHINE

Filed Oct. 24, 1927  4 Sheets-Sheet 1

Inventor
Ernest A. Gallison
by Roberts Cushman Woodberry
Attys.

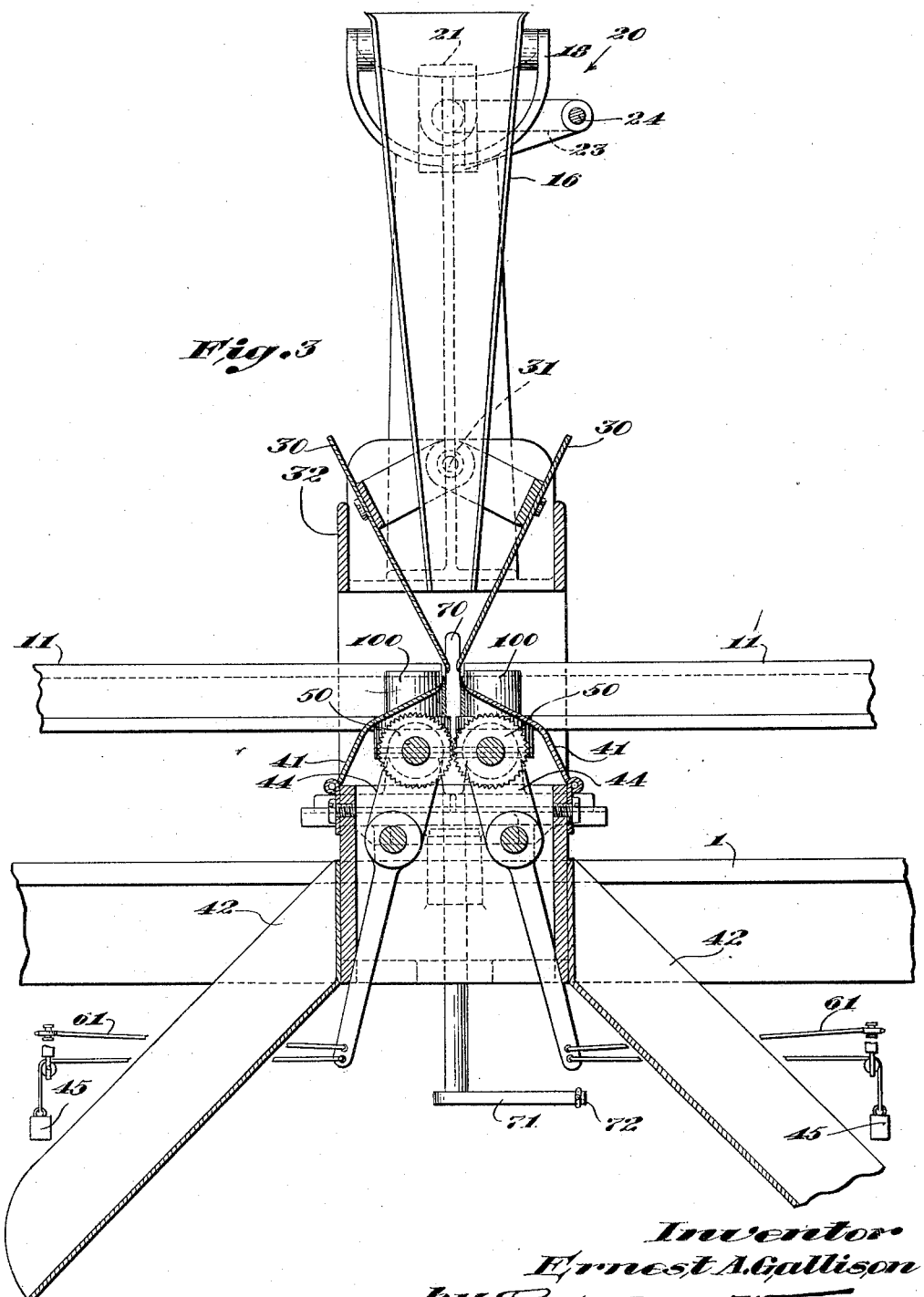

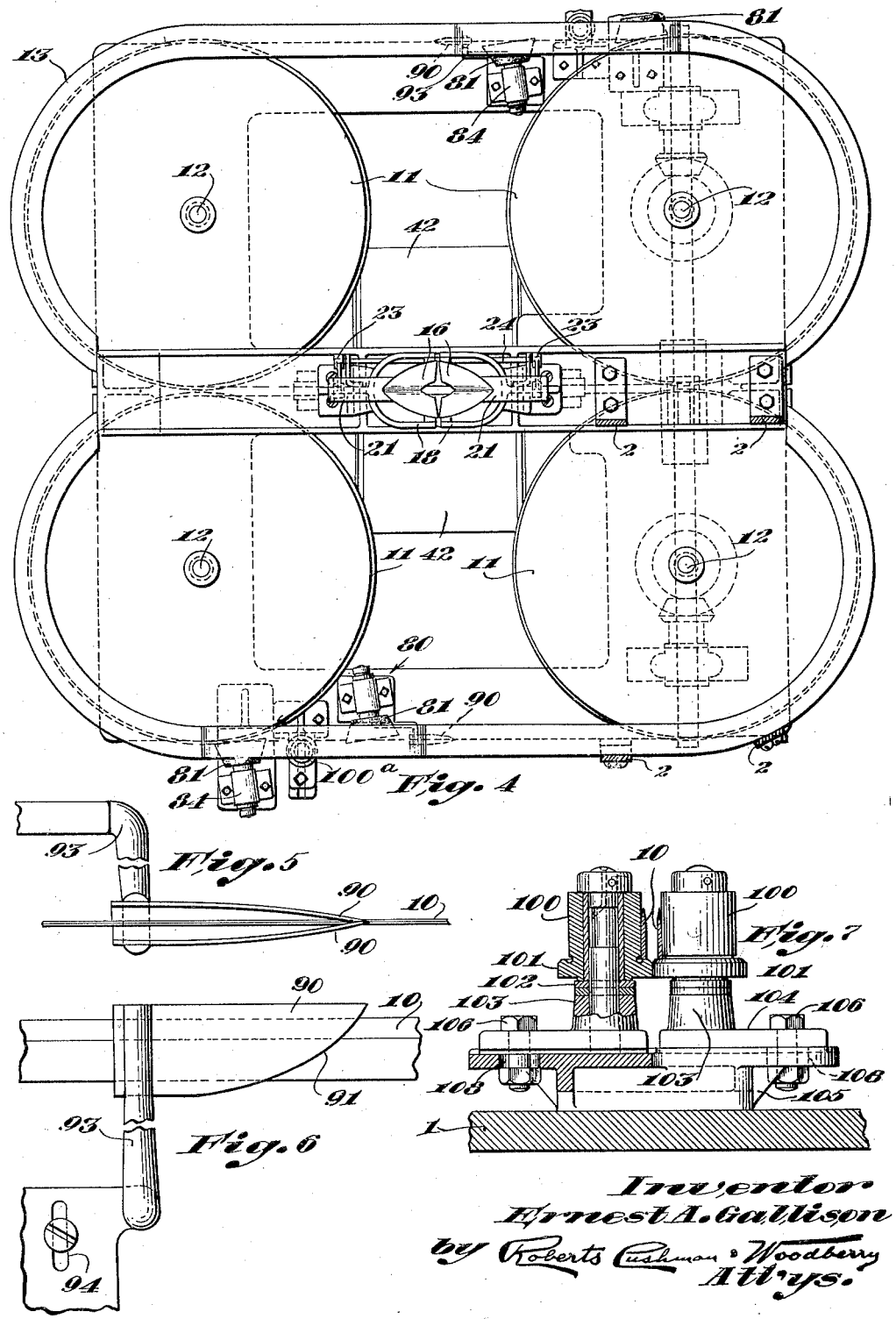

April 8, 1930.  E. A. GALLISON  1,754,157
FISH CUTTING MACHINE
Filed Oct. 24, 1927  4 Sheets-Sheet 4
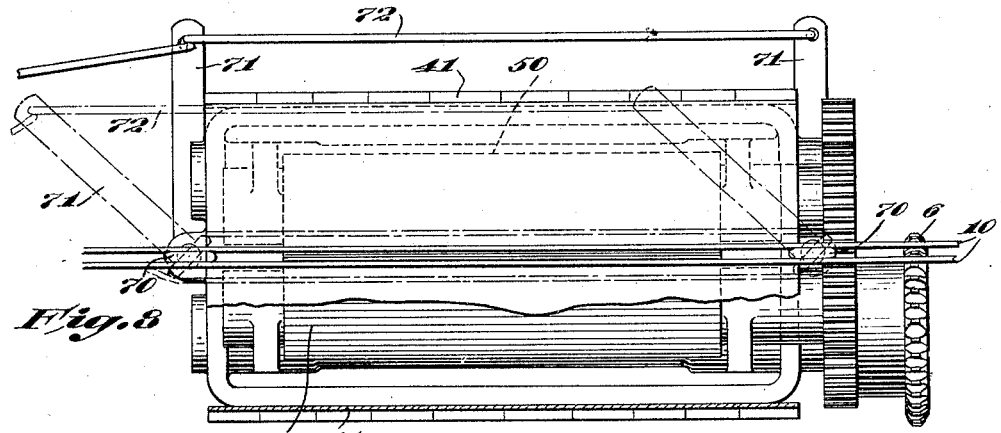
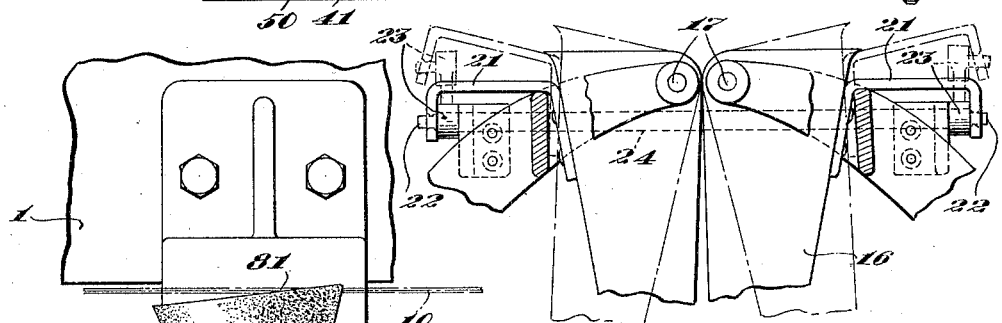
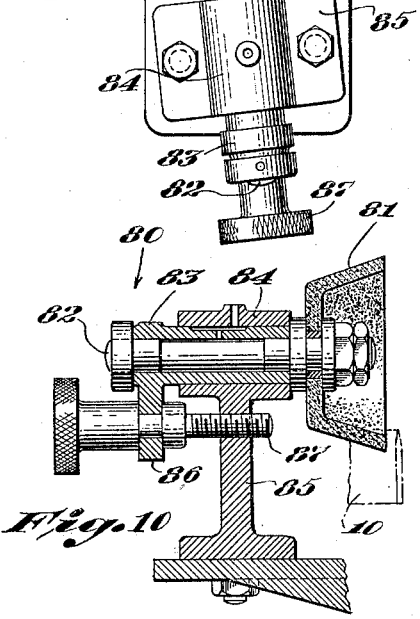
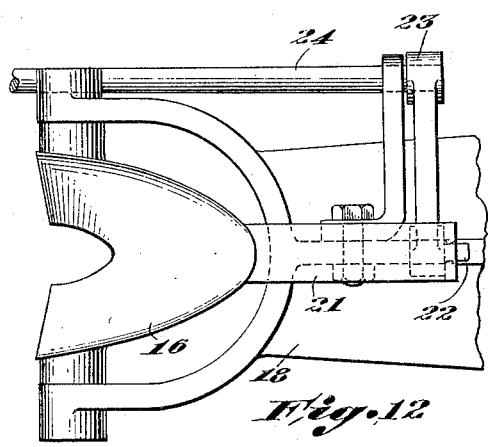
Inventor
Ernest A. Gallison
by Roberts Cushman Woodberry
Attys.

Patented Apr. 8, 1930

1,754,157

UNITED STATES PATENT OFFICE

ERNEST A. GALLISON, OF WATERTOWN, MASSACHUSETTS, ASSIGNOR, BY MESNE ASSIGNMENTS, TO BAY STATE FISHING COMPANY, OF BOSTON, MASSACHUSETTS, A CORPORATION OF MASSACHUSETTS

FISH-CUTTING MACHINE

Application filed October 24, 1927. Serial No. 228,124.

This invention relates to machines for cutting or filleting fish or for analogous purposes. A machine of this character is more particularly intended simultaneously to remove both of the fillets of the fish from the backbone and the adjoining fins.

This invention is particularly advantageous in that it avoids crushing or bruising the flesh of the fish; to this end it makes use of gravity in conjunction with means engaging a portion of the fish that is to be thrown away in order to move the fish body past the cutting knives. These knives are arranged in conjunction with sharpening elements that do not require separate driving means and in conjunction with cleaning means whereby the knives are adapted to be used for a long period of time without need of especial attention. Fish may be fed into a machine of this character by hand or automatically, for example by gravity, and are received in guiding means which is arranged automatically to center the fish in relation to the cutting knives. Guiding means of this character preferably are yieldably mounted and but lightly engage the fish so that the flesh thereof is not injured or crushed.

Occasionally the backbones of fish are broken before the fish enters the machine, and when the broken portion reaches the knives the fish may stop advancing. To care for such situations special means are provided, for example a pedal, operable at the will of the operator of the machine, to spread the knives in order to allow the broken portions of the fish to enter between the knives so that the fish may continue its advance through the machine. Special guiding elements or fillet diverting means are provided near the cutting edges of the knives for diverting the fillets to receiving factors at either side of the machine, while the intermediate slice, including the tail, backbone, and fins, passes between the knives and diverting elements to any suitable point of disposal. Preferably the various guide elements etc. are yieldably mounted so to move in response to the action of gravity rather than in response to the action of spring means so that an increasingly progressive resistance is not afforded to the movement of a fish body of more than normal size.

The above and further objects and advantageous features of the present invention will be apparent to those skilled in the art upon a reading of the subjoined description and claims in conjunction with the accompanying drawings in which Fig. 1 is a side elevation of the improved fish filleting machine;

Fig. 3 is a central vertical section through the machine, as indicated by line 3—3 of Fig. 1;

Fig. 4 is a plan view of the machine;

Fig. 5 is a plan view of a cleaning factor;

Fig. 6 is an elevation of the same;

Fig. 7 is a view partly in section and partly in elevation of a guide roll assembly for the knives;

Fig. 8 is a fragmentary plan showing parts appearing at the central portion of Fig. 2 to larger scale and partly broken away and in section;

Fig. 9 is a detail plan view of one of the sharpening factors;

Fig. 10 is a vertical sectional view of the same;

Fig. 11 is a view, partially in section and partially in elevation, of the guide elements which receive the fish fed to the machine; and Fig. 12 is a plan view of a portion of the equalizing means shown in Fig. 11 in conjunction with the said guide elements.

Figure 1:
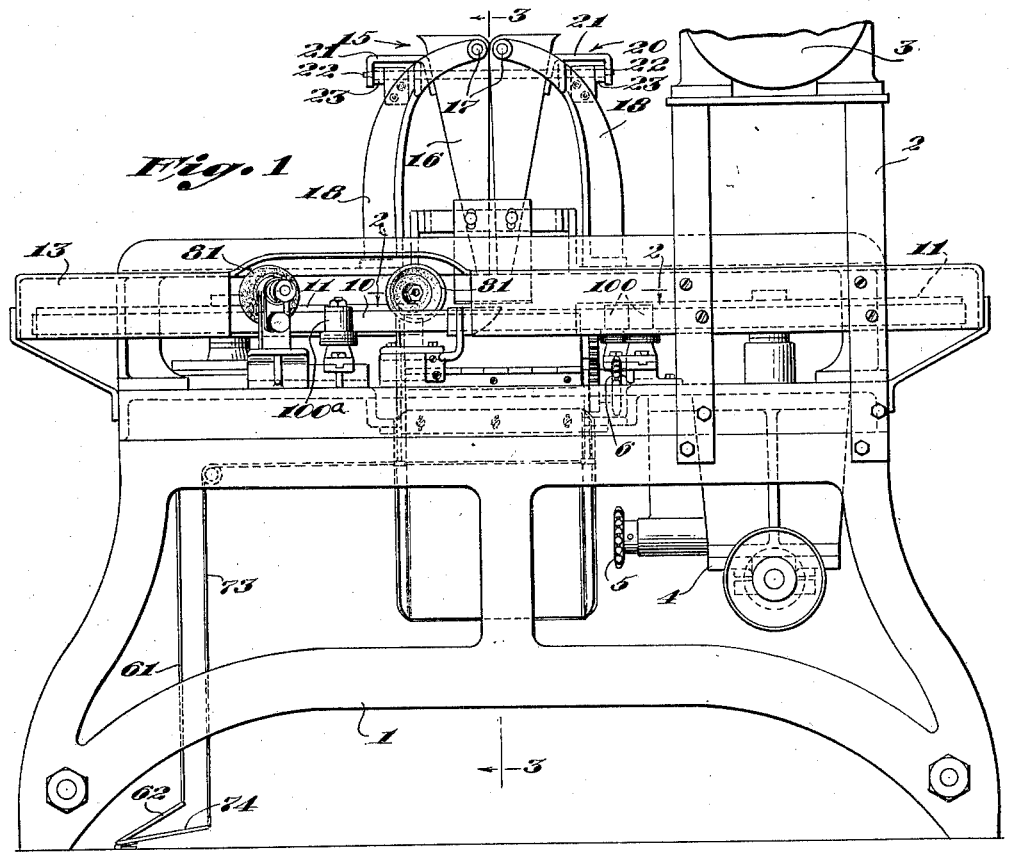
Figure 2:
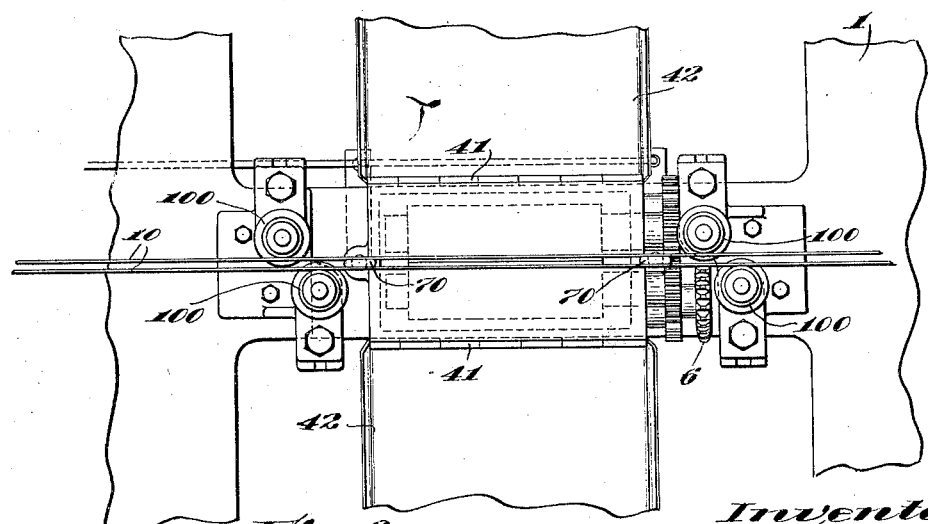
Fig. 2 is a fragmentary plan view, to larger scale substantially at the plane of line 2—2 of Fig. 1.

A machine of the type exemplified in the accompanying drawings preferably comprises a table-like frame 1 which supports the various component factors and elements of the machine; for example, the table may be provided with a stand 2 to support a motor 3 which drives the knives and rolls of the machine by any suitable means, such as through gearing mounted in box 4 and through sprockets 5 and 6. Located adjoining the bed portion of the machine are a pair of endless band knives 10 with their cutting edges located uppermost. These band knives are mounted upon the pulleys 11 which in turn are rotatably fixed upon studs 12 projecting upwardly from the frame 1. Suitable guards 13 may be located about the outer portions of the band knives, the latter having parallel runs at the central parts of the machine, (Fig. 4).

Disposed above these portions of the knives is guiding means, designated in general by numeral 15, (Figs. 1, 11 and 12) which may comprise two sheet metal parts 16 of complementary form which when juxtaposed provide an element of substantial frusto-conical contour. These elements 16 preferably have their upper portions pivotally mounted, as designated by numeral 17, upon the brackets 18 which extend upwardly from frame 1. Suitable equalizing mechanism, designated in general by numeral 20, is adapted to ensure the substantially equal movement of the two guide elements in response to the downward movement of a fish body therethrough or therebetween. Thus when a fish body of suitable size is dropped into the guide elements 16, they are spread apart in order to permit passage of the fish. At the same time, due to their equalizing movement, they tend to center or position the fish in relation to the knives 10. The equalizing mechanism is shown in greater detail in Figs. 11 and 12 and comprises a pair of brackets 21 which have their inner ends secured to the elements 16 and have their outer ends articulated upon the crank pins 22 which in turn are mounted upon the outstanding cranks 23. Cranks 23 are connected to the longitudinal rod 24 which is rotatable in response to the angular movement of either crank 23. Obviously, therefore, both cranks 23 must move through an equal angle, and accordingly brackets 21 and elements 16 must move an equal amount.

Disposed below the guide means 15 are the auxiliary guiding elements 30 which are pivotally mounted, as indicated at 31, Fig. 3, upon a sub-frame 32 which in turn is supported by frame 1. Elements 30 are preferably offset in relation to pivots 31 so that their lower ends are yieldably urged inward under the influence of gravity in order to aid in centering and guiding the fish in relation to knives 10. Juxtaposed to the cutting edges of knives 10 are the diverting elements 41 which are adapted to engage the severed faces of the fillets and to divert the same to a pair of troughs 42. These diverting elements are preferably of sheet metal and are hinged at their lower edges thereby permitting their free upper edges to move outwardly when the knives are abnormally separated as hereinafter described. Located below the knives 10 are two rolls 50, which preferably have corrugated faces, in order the more effectively to grip the tail of the fish and to draw the intermediate slice downwardly between knives 10. These rolls preferably are yieldably mounted upon the upwardly inclined brackets 44 which are connected with the weights 45 in order normally to urge the rolls inwardly toward each other.

Special control means comprising cables 61 and a pedal 62 are provided in order to bring the rolls more firmly toward each other to provide additional traction if desired. In order to permit the movement of a fish through the machine, which for some reason, as for example a broken backbone, fails to advance properly through the machine, I provide special means for spreading the knives in order to space them at a greater distance than their normal distance from each other. For this purpose I provide a pair of elongate elements 70 which are disposed between the knives and adjacent respectively to the opposite ends of rolls 50, the elements 70 normally being substantially parallel to the knives. These elements 70 are mounted upon the rocker members 71 which are connected to the control rods 72, 73 and pedal 74 so that depression of the pedal will rotate the elongate elements so that their greatest dimension lies transversely rather than parallel to the adjoining knife portions. Thus the knives, which are somewhat elastic, may be moved from their fullline position to their dotted line position, as indicated in Fig. 8.

In order to permit knives of this character to operate successfully for a long period of time, it is essential to provide special sharpening means, designated in general by numeral 80, comprising a pair of oppositely disposed rotatable wheels 81. Preferably these wheels are of conical contour and may be formed of suitable abrasive material, being so disposed in relation to the cutting edge of each knife that they are rotated in response to the movement of the same and at the same time tend to sharpen the surface thereof. Thus, as indicated in Fig. 1, the lower portions of the wheels may be engageable by the knife edge in order to be rotated thereby. Preferably each of these wheels is mounted upon a rotatable spindle 82 which is received in an adjustable sleeve 83 that is telescopically mounted in the boss 84 at the top of a bracket 85, the latter being secured to frame 1. A depending ear of the bracket, designated by numeral 86, receives a rotatable screw 87 which is threaded into the body portion of the bracket in order to effect the adjustment of the grinding wheel or sharpening element inwardly in relation to the knife.

It is also desirable to provide cleaning means to remove material which becomes stuck upon the knife. For this purpose I provide a sheet metal cleaning factor comprising a pair of similar elements 90 (Figs. 5 and 6) which together substantially form a sheath having a curved edge 91 engaging the knife.

Preferably the material of elements 90 is suitably yieldable in order to permit the cleaning element to adapt itself to the knife and to provide a yieldable opposition to material which becomes stuck to the knife. Elements 90 are supported upon an upstanding bracket 93 which in turn may be vertically adjustable, as designated by numeral 94.

The pulleys 11 are provided with suitable flanges in order properly to position the lower edges of knives 10, while suitable guide rollers 100 are arranged to hold the parallel runs of the knives 10 in proper position adjoining the fish guiding means. These rollers 100 are shown more particularly in Fig. 7 and are provided with outstanding flanges 101 adapted to support the lower edges of the band knives. The rolls are rotatably mounted upon bushings 102 which in turn are supported upon the upstanding studs 103 which project upwardly from adjustable brackets 104. These brackets are secured to a support 105 by means of fastenings 106 which extend through slots 108 in the support and which may be loosened in order to permit adjustment of the rolls 100 inwardly and outwardly in relation to the knives.

Adjoining each of the sharpening factors 80 I preferably locate a single guide roll 100ª. Thus one sharpener may be located adjoining a portion of the knife which is leaving the pulley 11. The guide roll 100ª may be disposed upon the outer side of the knife and at a somewhat greater distance from the pulley, while a second sharpening factor may be located upon the opposite side of the knife. The guide rolls 100ª adjoining the sharpening factors are particularly effective in supporting the knife against any tendency to move or twist downwardly as it contacts with the adjoining sharpening factors.

I claim:

1. A machine of the class described comprising a movable knife, an element above the knife designed to guide a fish downwardly in a path substantially at right angles to the cutting edge of the knife, and a feed roll to aid gravity in causing movement of the fish past the knife.

2. A machine of the class described comprising a pair of spaced movable knives, means defining a guide passage to direct fish downwardly toward the knives, and a pair of rolls below the knives to draw the fish past the same.

3. A machine of the class described comprising a pair of spaced movable knives, means defining a guide passage to direct fish downwardly toward the knives, and a pair of rolls below the knives to draw the fish past the same, the bite of said rolls being aligned with the space between the knives whereby they may grip the portion of the fish passing between the knives.

4. A machine of the class described comprising a pair of movable, spaced, endless knives and means for guiding a fish downwardly to the knives, said guide means including a pair of yieldably mounted guide elements.

5. A machine of the class described comprising a pair of movable, spaced, endless knives, means for guiding a fish downwardly to the knives, said guide means including a pair of yieldably mounted guide elements, and a pair of rolls below the knives to grip that portion of the fish which passes between the knives.

6. A machine of the class described comprising a pair of movable, spaced, endless knives, means for guiding a fish to the knives, said guide means including a pair of yieldably mounted guide elements, a pair of rolls arranged to grip that portion of the fish which passes between the knives, and guide elements adjoining the knives for laterally diverting fillets separated from the intermediate portion gripped by the rolls.

7. A machine of the class described comprising a pair of movable, spaced, endless knives, means for guiding a fish downwardly to the knives, said guide means including a pair of yieldably mounted guide elements, a pair of rolls below the knives to grip a portion of the fish passing between knives, and yieldably mounted guide elements adjoining the cutting edges of the knives to direct the fillets away from the portion which passes between the knives.

8. A machine of the class described comprising a pair of movable, spaced endless knives, said knives having portions in juxtaposed parallelism, means for guiding a fish to the juxtaposed portions of the knives, and means for spreading the portions of knives adjacent to the guide means to a position wherein they are spaced more than their normal distance from each other.

9. A machine of the class described comprising a pair of movable, spaced, endless knives and means for guiding a fish downwardly to the knives, and guide elements to hold the knives in normal position adjoining the guide means.

10. A machine of the class described comprising a pair of movable, spaced, endless knives, means for guiding a fish downwardly to the knives, guide elements to hold the knives in normal position adjoining the guide means, and means selectively operable to spread the knives from their normal position.

11. A machine of the class described comprising a pair of movable, spaced, endless knives, means for guiding a fish downwardly to the knives, said guide means including a pair of movable, yieldably mounted guide elements, means for equalizing the movement of said elements, and a pair of rolls below the knives to grip a portion of the fish passing between the knives.

12. A machine of the class described comprising a pair of movable, spaced, endless knives, means for guiding a fish to the knives, said guide means including a pair of yieldably mounted guide elements, a second pair of yieldably mounted guide elements beyond the first pair, a pair of rolls arranged to grip that portion of the fish passing between the knives, and guide elements adjoining the cutting edges of the knives for diverting fillets from the intermediate strip gripped by the rolls.

13. A machine of the class described comprising a pair of movable, spaced, endless knives, means for guiding a fish downwardly to the knives, means for spreading the portions of the knives below the guide means to a position wherein they are spaced more than their normal distance from each other, and elements for diverting fillets from the intermediate portion of the fish that passes between the knives, said elements being movable in response to the spreading of the knives.

14. A fish filleting machine having, in combination, a pair of band knives having portions thereof running in adjacent planes spaced a short distance apart, and means for feeding a fish against said portions of the knives including a guide for the fish, a pair of gripping rolls located in proximity to the cutting edges of the knives for feeding a fish against the same, and movable supporting members upon which said gripping rolls are mounted.

Signed by me at Boston, Massachusetts, this 19th day of October, 1927.

ERNEST A. GALLISON.